P. BOTS.
BOX FOR HOLDING AMPULLÆ, PHIALS, AND THE LIKE.
APPLICATION FILED OCT. 2, 1915.
1,268,920.
Patented June 11, 1918.
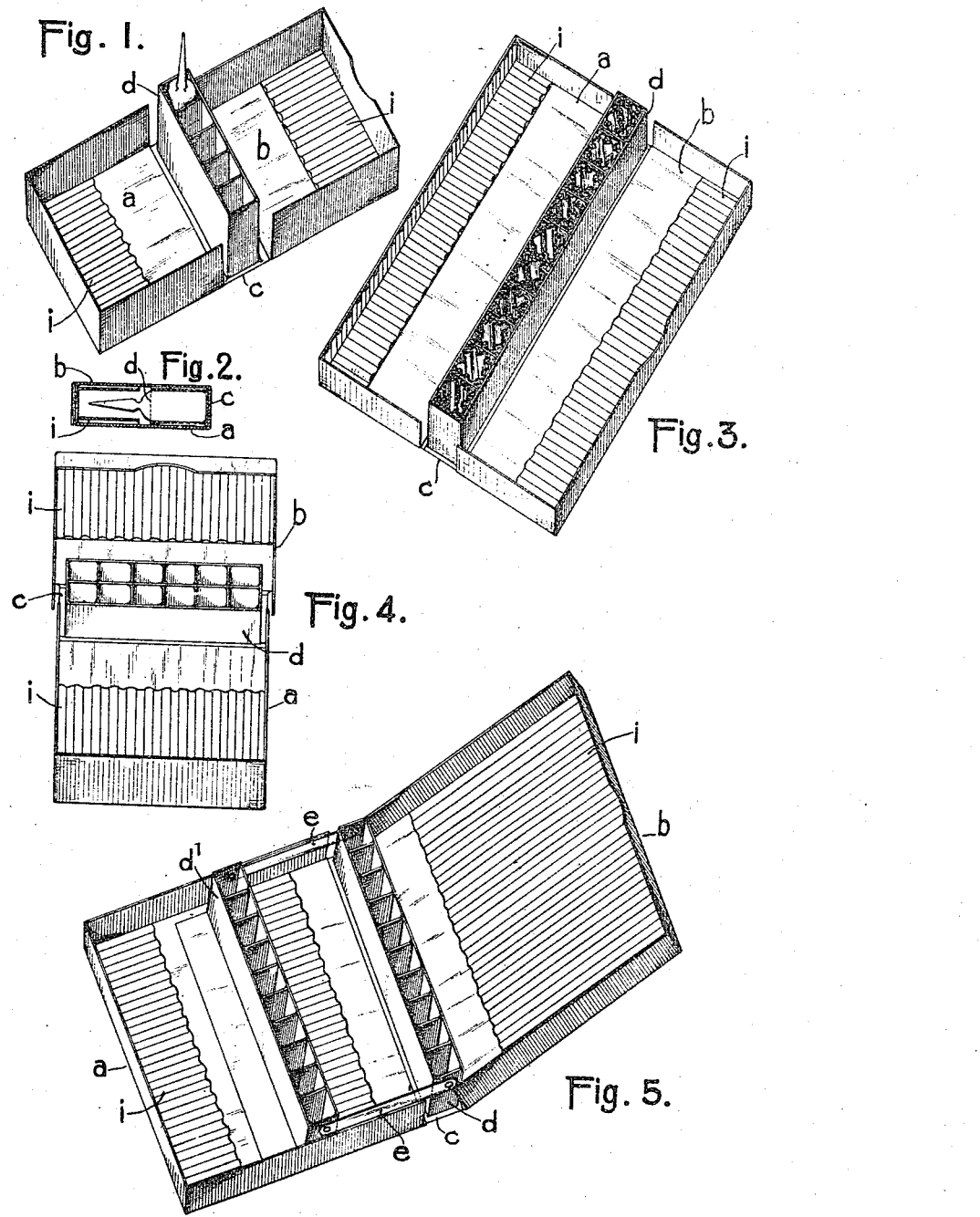

UNITED STATES PATENT OFFICE.

PAUL BOTS, OF BASEL, SWITZERLAND, ASSIGNOR TO SOCIETY OF CHEMICAL INDUSTRY IN BASLE, OF BASEL, SWITZERLAND.

BOX FOR HOLDING AMPULLÆ, PHIALS, AND THE LIKE.

1,268,920.     Specification of Letters Patent.   Patented June 11, 1918.

Application filed October 2, 1915. Serial No. 53,671.

*To all whom it may concern:*

Be it known that I, PAUL BOTS, a citizen of the Swiss Republic, and resident of Basel, Switzerland, have invented a new and useful Box for Holding Ampullæ, Phials, and the like, of which the following is a full, clear, and exact specification.

This invention relates to a box for holding ampullæ, phials and the like which is so constructed that when the box is opened the ampullæ stand up in a vertical position, thus rendering them easily accessible to the fingers, while when the box is shut the ampullæ are held fast and cannot come into contact with each other.

According to the invention, the box comprises two sections arranged to be inserted within one another and a cellular holder for the ampullæ, phials and the like arranged on a movable connection part between the two box sections, which, when the box is being opened, allows the folding back flat of the said box sections and raises the cellular holder to upright position wherein the ampullæ, phials and the like are easily accessible to the fingers.

The cellular holder may have one or more rows of cells and its cells may be furnished with a soft lining.

When the box has greater sizes, the cellular holder arranged on the movable connection part of the box may be coupled with one or more additional cellular holders movably placed within one of the box sections, in such a way that when the box is being opened, all the cellular holders are simultaneously set in upright position.

The accompanying drawing represents several embodiments of the subject of the present invention.

Figure 1 is a perspective view of a box having a single row of cells and being shown fully opened;

Fig. 2 is a cross section through said box when being in shut condition;

Fig. 3 shows a perspective view of a second form;

Fig. 4 is a perspective view of an opened box with a cellular holder having two rows of cells;

Fig. 5 shows a perspective view of an opened box with two coupled cellular holders.

In the box represented by Figs. 1 and 2, $a$, $b$, indicate the two box sections provided on three sides with side walls and arranged to be inserted within one another and which, on their free side, are movably joined to one another by means of a movable connection part $c$. This connection part allows the folding back flat of the box sections $a$, $b$. It carries a cellular holder $d$, rigidly fixed thereon, having a row of cells for receiving with gripping action the ampullæ, phials and the like. When the box is closed, the ampullæ, phials and the like contained in said cellular holder $d$ are held fast in lying position on the one hand by the walls of the cells and on the other hand by a corrugated packing $i$ provided for on the inside of the box sections. However, when the box is being opened, the box sections being folded down flat, the cellular holder $d$ is automatically set to an upright position (Fig. 1), wherein it presents the ampullæ, phials and the like upright and consequently easily accessible to the fingers. It results therefrom that, while the ampullæ, phials and the like are unvariably kept fast and separated from each other in the closed box, in the open condition of the box, they are easily accessible and can properly be withdrawn from the cells of the upright standing holder.

The form represented by Fig. 3 differs from that just above described by the arrangement, in the cells of the holder $d$, of a soft lining formed for example of plush, wadding, cellulose-wadding, undulated paper and the like, while in the box represented by Fig. 4 the cellular holder $d$ has two parallel rows of cells instead of a single one.

In the form represented by Fig. 5, the cellular holder $d$ on the movable box part $c$ is combined with an additional cellular holder $d^1$ arranged in the box section $a$ so as to be movable in the same direction as the first holder and coupled with the main holder $d$ by links $e$ of pasteboard, celluloid and the like, in such a way that when the box is being opened, both the cellular holders $d$, $d^1$ are simultaneously raised to their upright position for rendering the ampullæ easily accessible to the fingers. Instead of one single additional cellular holder, there may be two or more of such holders.

In all cases, the coupling of the cellular holders by means of links is of the kind of a parallelogram connection so that all the cellular holders are caused to perform a simultaneous raising and tilting movement in the same direction when the box is being opened or closed.

What I claim is:

A box for holding ampullæ, phials and the like, comprising two box sections arranged to be inserted within one another, a movable connection part between said box sections allowing them to be folded back flat, and having a width corresponding substantially to the height of said box sections, a cellular gripping holder carried by said movable connection part so as to stand up in an upright position when the box is being opened, an additional cellular gripping holder arranged within one of the box sections so as to be movable in the same direction as the first cellular holder, and coupling means between said cellular holders so arranged as to cause a simultaneous raising and tilting thereof in the same direction, substantially as described.

In witness whereof I have hereunto signed my name this 8th day of September 1915, in the presence of two subscribing witnesses.

PAUL BOTS.

Witnesses:
PAUL GYMILLER,
AMAND BRAND.

Copies of this patent may be obtained for five cents each, by addressing the "Commissioner of Patents, Washington, D. C."